April 12, 1966    J. O. IVIE    3,245,269
AUTOMATIC SAMPLING DEVICE
Original Filed Sept. 25, 1958    6 Sheets-Sheet 2

INVENTOR.
James O. Ivie
BY
Holcombe, Wetherill & Brisebois
ATTORNEYS

Fig. 4.

ǴUnited States Patent Office 3,245,269
Patented Apr. 12, 1966

3,245,269
AUTOMATIC SAMPLING DEVICE
James O. Ivie, 7165 Delaware St., Riverside, Calif.
Original application Sept. 25, 1958, Ser. No. 763,397.
Divided and this application Oct. 24, 1963, Ser. No. 319,921
1 Claim. (Cl. 74—3.54)

This application is a division of my application Serial No. 763,397, filed September 25, 1958, and entitled Automatic Sampling Device (now abandoned).

The general object of the present invention is to provide an improved gas sampling device. Heretofore gas samples from flowing streams have usually been withdrawn manually or they have been collected by the displacement of liquid in the sample bottle and my improvements aim to regulate and make certain the automatic operation of sampling apparatus for continuously sampling the gas in a flowing stream.

It is an object of the present invention to provide a motor driven gas sampling device that will withdraw certain predetermined measured samples of the gas from a gas main.

It is also an object of the present invention to provide an automatic sampling device that is used in conjunction with a gas chromatography measuring cell so that a gas sample may be withdrawn, composition determined and the sample either discharged or passed to a receiving flask where it is collected, all operating automatically.

It is a still further object of the present invention to provide reliable electrical interconnections between the various parts of an automatic gas sampling and composition determining device so that the automatic valve system will operate on demand from the recorder connected to the gas chromatography unit.

My improvements comprise various features of novelty, the construction and mode of operation of which characterize this invention and are pointed out with particularity in the claims annexed hereto and forming part of this specification. For a better understanding of the invention, however, its characteristics and advantages, and specific results obtained by its use, reference is made to the accompanying drawings and descriptive matter in which there is illustrated and described a preferred embodiment of the invention.

*General arrangement*

Referring to the schematic diagram of FIG. 1 wherein are indicated the general combination and some details of operating parts that are used in my improved machine, the functions of the various elements as hereinafter described will be clear to those familiar with gas chromatography.

A mixed gas sample is slowly forced through the tube 1 which is filled with resin, thereby separating the gas sample into individual gases, so that they will pass through the measuring cell 2 of the gas chromatography machine successively as individual gases. The electrical connection between cell 2 and recorder 3 causes the recorder to draw a curve 4 with humps on it such as B, C, and D for each of the individual gases. Within the recorder, two switches 5 and 6, are used to control the operation of the delay timers 7 and 8 within the sample collector unit. The delay timers operate a valve motor 9 through cam operated valve switch 10. The sample delay timer 7 causes the valve to move until the switch 10 breaks the contact with the timer 7 and makes contact with the waste delay timer 8. Timer 8 will cause the valve to move until the contact with waste timer 8 is broken and contact with sample timer 7 is again made. This is caused by the high and low positions of cam 11 on the shaft of the motorized valve. The motorized valve alternately switches to a "sample" position or a "waste" position, depending upon which of the two timers is energized.

A novel multiple unit squeeze valve is operated by the valve motor 9. One of the valve units (indicated by the character "W") takes care of the waste gases coming from the cell. Helium is usually used to force the gases being measured through the system, and the recorder stays at zero when helium passes through the cell. The waste gas can pass through tube 17 out through valve W and pipe 12 into any desired collector or to waste. When butane or other similar gas passes through the cell 1 the recorder 3 moves above zero and passes the switch point line (indicated by vertical broken "A" on FIG. 1, although this line is usually horizontal on the device as mounted for use). Switch 5 then moves from the waste position to the sample position. The delay timers 7 and 8 give the gas passing through the cell time to reach the first of the sample catching bulbs 15, 15; then the valve motor 9 is turned on to open valves 13 and 14 (marked S and R respectively) in one of the multiple valve units and close waste valve W. Valve 14 permits the helium in bulb 15 to move out to waste through the tube 18 and pipe 12 while the gas sample moves in through valve 13. When the pen (not shown) of the recorder has moved to point B and back down to where it crosses switch point line A again, switch 5 changes from the sample position to the waste position. Timer 8 then gives the proper time delay to allow the last end of the specific separated individual gas sample to reach the first sample collecting point before the valve again changes position and shuts off valves 13 and 14 and again opens valve W for waste.

The motorized valve can be built up with enough units for any number of sample catching bulbs 15. The valve assembly used in this description uses six sample bulbs 15 and has six valve units each having a valve S for letting the sample into the bulbs and a valve R for the relief of the sample bulbs, and one waste valve W. The S and R squeeze valves of the valve unit for each sample tube opens before the waste valve W closes; also waste valve W opens before any of the S and R valves close. This means that at no time is there any blockage of the flow in tube 17.

Each of the sample bulbs 15 is attached to the motorized squeeze valve assembly by a pair of rubber connections 19 and 20. Two stop-cocks 21 and 22, which are a part of each gas sample catching bulb 15, are provided to seal the gas in the bulb before the rubber connections are broken between the S and R connections of the motorized valve assembly. The sealed bulb 15 can then be moved to other equipment for further testing and identification. The insulated container 16 may be raised to put all of the bulbs 15 into liquid air. This permits as large a sample as possible of the desired gas to be frozen into the test bulbs 15 before the machine seals off the catch. Excess gas would be discharged through the R valves into line 18 and out into the waste line.

The time delay is necessary because of the length of tube 17 between the measuring cell 2 and the various points where it tees off for the various sample bulbs 15 on the motorized valve assembly. It will be noted that the length of tube 17 leading to the first of the sample bulbs 15 is different from that leading to the last sample bulb requiring a longer time for the gas to reach the last bulb. A shift compensator mechanism 23 is provided to correct for this increase of time by causing an increase in the time delay in timer 7 and timer 8. Whenever the waste timer causes the valve motor to operate it also causes the shift compensator 23 to operate and reset the delay interval of timers 7 and 8 to a new valve. The timers, as well as the shift compensator, can be adjusted to operate for various sampling rates.

The gases that are being measured in a mixed sample do not always come through the measuring cell with a waste interval between them, as is indicated by the portion of curve 4 shown by C. Occasionally two gas samples will be so close together that their bottom portions overlap. In this case the recorder pen moving down the chart does not even reach the switch point indicated by the line A but moves back up the chart for the next gas recording. See the two points C and D on curve 4 in FIG. 1. In this case switch 5 stays in contact with the sample timer 7. A special switch 6 is provided in the recorder which holds one position when the recorder is moving up the chart and another position when it is moving down the chart. This contact is connected to a relay system 24 which will cause timer 8 to shift the valve past the next waste position right on to the next sample collecting position whenever such a curve reversal such as between C and D takes place.

The above description gives a functional outline of the working parts in the automatic sample collector. The delay timers are special units built up for this specific purpose. Each timer has a magnetic clutch which permits the timer to reset itself whenever the current is removed from the clutch. Manual shifting of the multiple squeeze valve is also provided for. A stopping system is also provided after the last sample is completed, and a resetting means is provided to put the equipment again into automatic operation. These features will become evident after each functional part has been fully described.

*Constructional and operational features*

Figure 2:
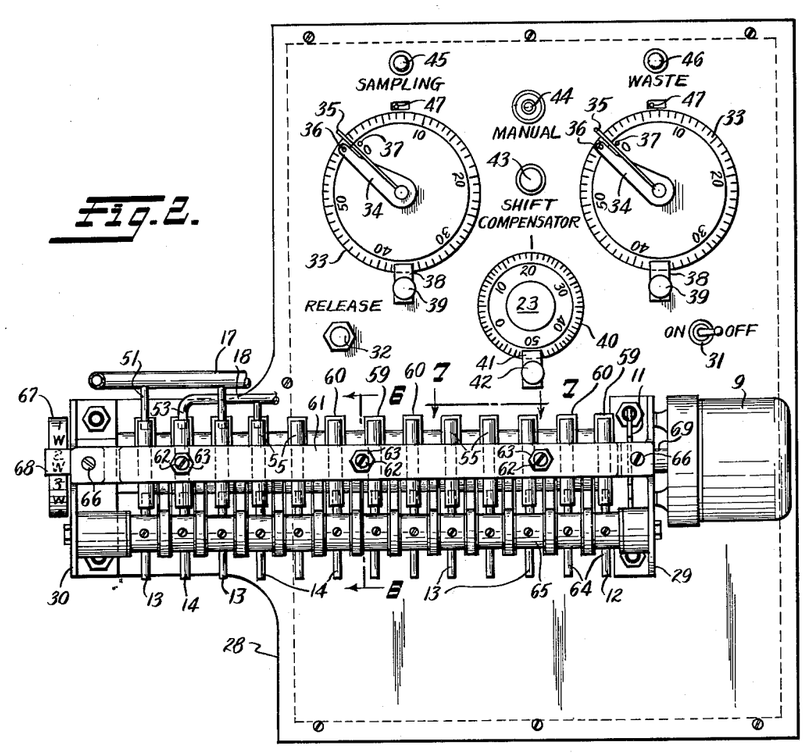
FIG. 2 is a front elevation of this automatic sample taking machine.
Figures 3, 5:
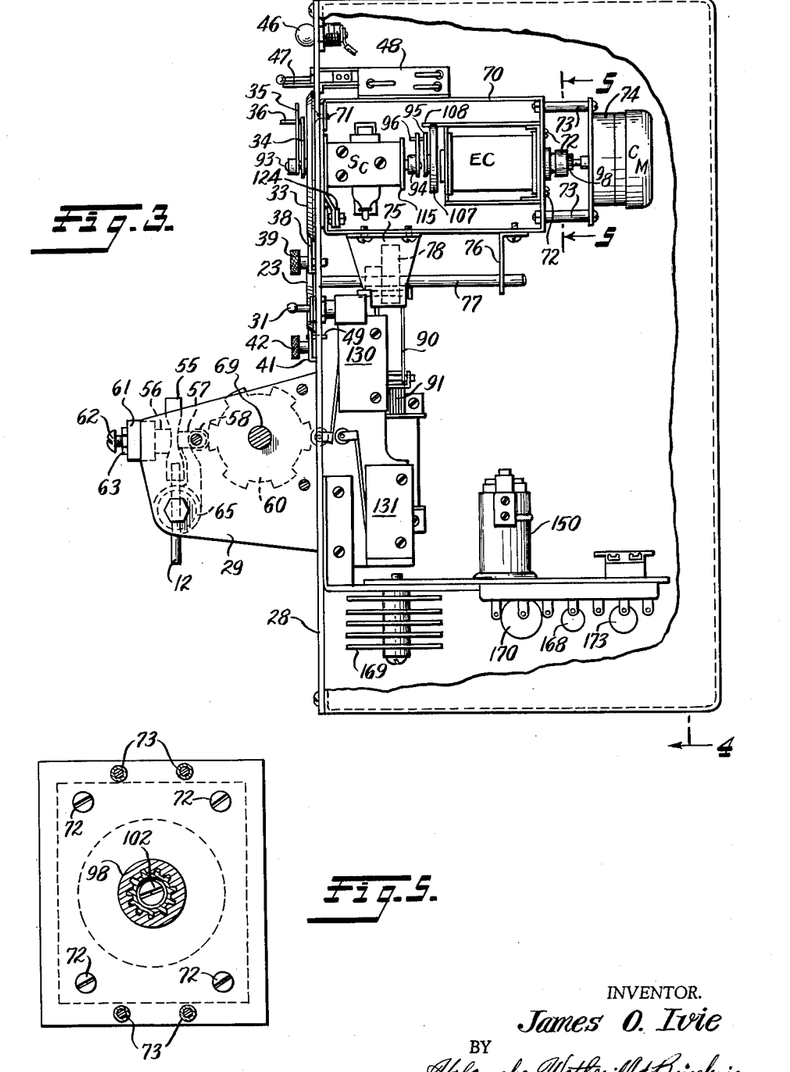
FIG. 3 is a fragmentary side elevation thereof, as viewed from the right of FIG. 2.
FIG. 5 is an enlarged sectional view of a delay timer unit taken on the line 5—5 of FIG. 3.

The operating mechanism and timing devices are mounted on the front panel of the machine, shown in FIGS. 2 and 3. The panel 28 has a sidewise and forwardly offset section to place the first unit of the motor operated squeeze valve unit as close as possible to the waste outlet of the "Fisher-Partitioner" gas chromatographic apparatus to which it is directly connected by the manifold 17. Manifold 17 comes out of the partitioner and takes a right angle turn to contact with all of the S valve units 13 and with the last valve W. The complete motor valve unit is bolted to the panel 28 by the end plates 29 and 30.

Above the motor valve unit is a timing and control unit electrically operated under the control of the recorder. A main power switch 31 is provided and a push button switch 32 releases the automatic stops of the timing and control unit when a new sample of gas mixtures is ready to start through the apparatus. Both automatic timers 7 and 8 may be set in value between 0 to 60 seconds by adjusting the respective dials 33 to the desired values, and then locking them there by the clamps 38 and thumb screws 39. The adjustment of the shift switch compensation timer 23 is made with dial 40 and is locked at the desired setting by clamp 41 and screw 42. An overload or safety fuse 43 is provided. A manual switch 44 may be used to manually shift the motor valve to any position. Pilot lights 45 and 46 indicate when power is applied to each of the respective timers, and as both timers are identical in structure, the same legend numbers are used to indicate the respective parts of each timer.

Figures 8, 9, 10, 11, 12, 13:
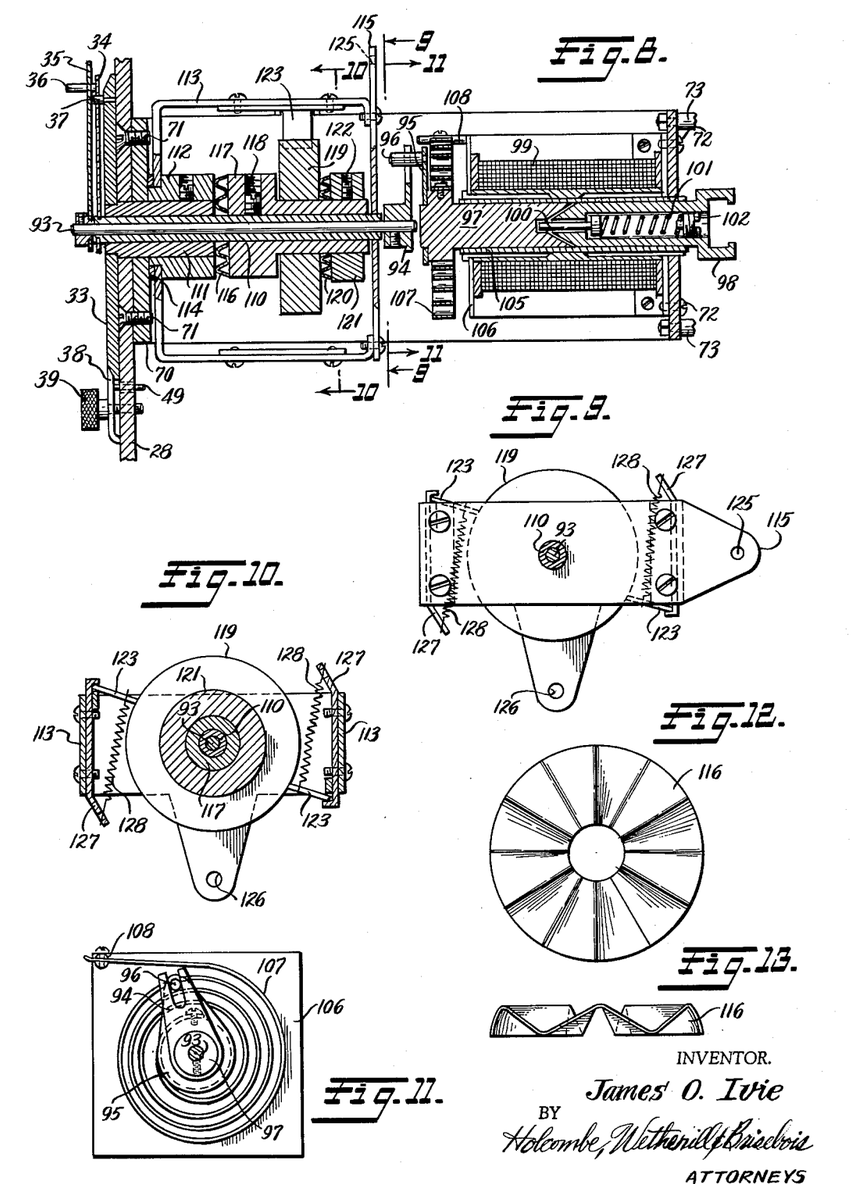
FIG. 8 is an enlarged fragmentary horizontal sectional view taken through the principal axis of one of the delay timer units.
FIGS. 9, 10 and 11 are sectional views on lines 9—9, 10—10 and 11—11 of FIG. 8, looking in the direction of the arrows respectively.
FIG. 12 is a plan view of one of the spring elements.
FIG. 13 is a side elevation of the spring element of FIG. 12.
Figures 14, 15:
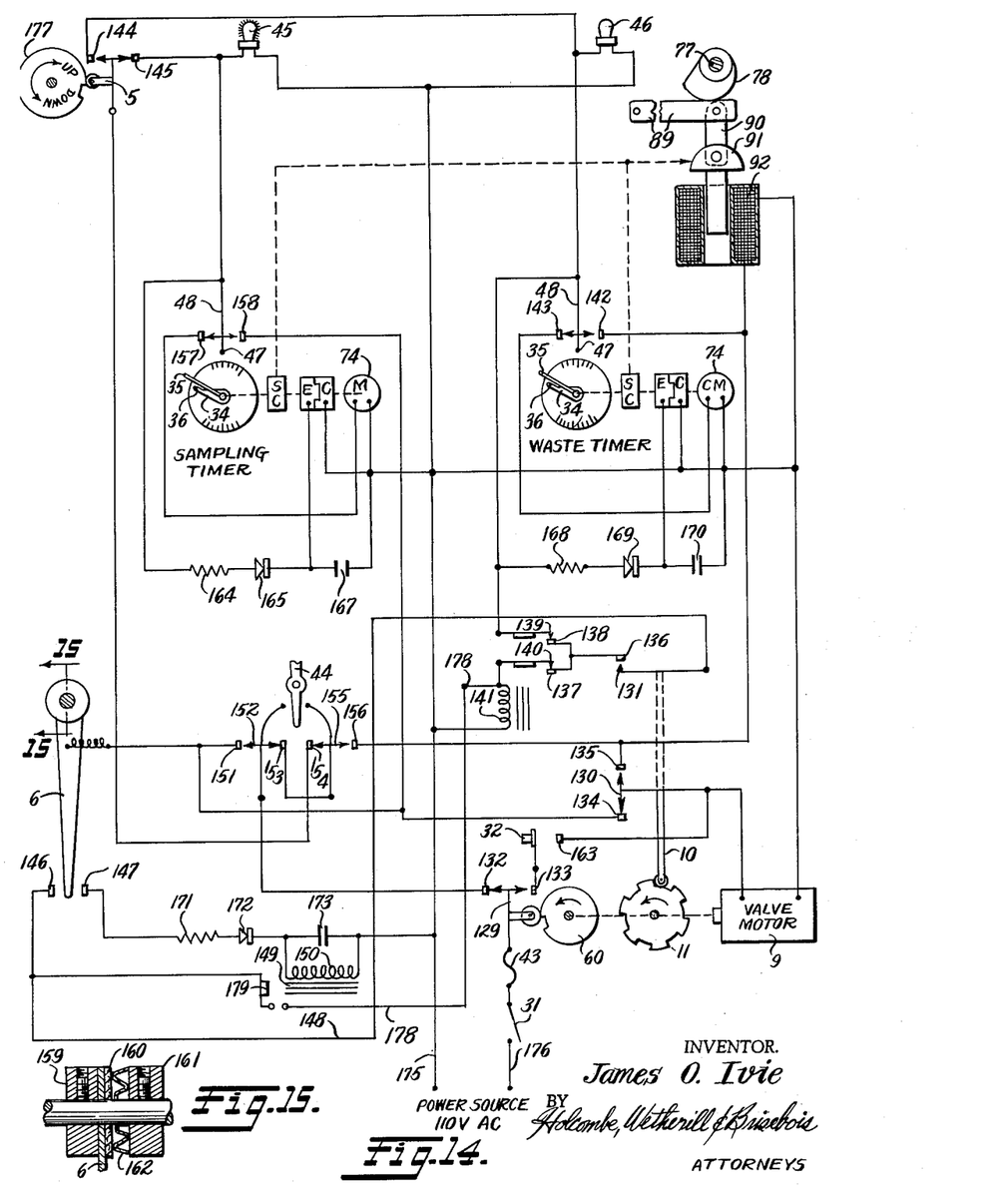
FIG. 14 is an electrical circuit diagram.
FIG. 15 is an enlarged fragmentary sectional view taken on line 15—15 of FIG. 14.

Referring to FIGS. 2, 3 and 8, the movable arm 34 serves to control the delay time increment and initiates the sequence of automatic operations in connection with the filling of each sample catching bulb. This arm has a pin 36 at its end which acts as a stop for the light clock driven time measuring arm 35 of the timer. In timing operations this arm 35 moves between stop 36 and pin 47 which comes through a hole in the panel and the other end of which connects with the armature of a microswitch 48 behind the panel, as shown in FIGS. 3 and 14. When arm 35 touches pin 47 it moves this switch and sends power to the valve motor 9; and whenever the waste timer 8 sends power to the valve motor 9, arm 34 will shift pin 36 a little further away from pin 47 as hereinafter described. This increases the time interval between successive samplings as arm 35 now has further to go to throw the switch. The amount that pin 36 is moved back with each of these shifts is determined by the setting of dial 40. This may be anything between zero to 2 seconds or the maximum number of seconds desired for each change per shift. The amount is indicated by the number of the setting of the dial 40.

Figure 6:
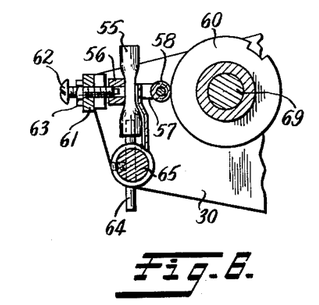
FIG. 6 is a fragmentary vertical sectional view of the multiple unit squeeze valve taken on the line 6—6 of FIG. 2.
Figure 7:
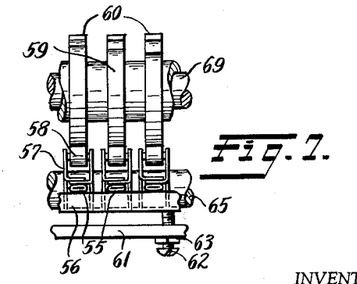
FIG. 7 is a fragmentary horizontal view of the squeeze valve taken substantially on the line 7—7 of FIG. 2.

The motorized valve is of special design for compactness. Between the two end plates 29 and 30 duplicate groups of parts are assembled for thirteen squeeze valves. Thirteen stainless steel tubes 64 are mounted vertically in rod 65, extending through it from top to bottom, as shown in FIGS. 2, 6 and 7. Mounted on the same rod 65 in alignment with these tubes is the same number of yoke-like parts 57 which are free to rotate on rod 65 at one end and at the other end each has a roller 58 which presses against one of the cams 59 for the waste valves or one of the cams 60 for the sampling valves. Roller 58 presses a part of yoke 57 against the adjacent rubber tube 55 to pinch it against the bar 56. This stops any flow through this part of the rubber tube, until the roller 58 drops into a notch provided for it in the cam to permit flow into or out of the corresponding bulb 15.

There are three sets of screws 62 on bars 61 to adjust the pressure on the rubber tubes of all thirteen valves in the unit, and the three sets of nuts 63 to lock this adjustment. After this adjustment has been made, bar 61, together with bar 56, can be moved out of the way for replacing the rubber tubes of all the valves without disturbing the squeeze adjustment by removing the two screws 66 which fasten the squeeze assembly to the end plates. See FIGS. 2 and 7. The rubber tubes 55 connect the manifolds 17 and 18 with the stainless steel tubes 12, 13 and 14, respectively, such as between tee 51 on tube 17 and tube 53 of manifold 18 for the first tube 15, and likewise for the entire series of tubes. One feature of this valve is that various multiple units can be made up by varying the length of the bars 61 and 56 and the rod 65. The length of these three parts determines the number of valve units that can be assembled between the two end plates. The cams are made up to suit the specific operation requirements and in general they may be set to cause the bulbs to be filled in immediate succession. The squeeze valve assembly is operated by motor 9 through suitable gearing which reduces the speed of cam rotation to a few revolutions per minute. Cam 11 disposed on the valve shaft 69, is used to control the stopping positions of the motor valve. On the end of the valve or cam shaft 69 opposite the motor is an index wheel 67 and the marker 68 to indicate the positions of the several valve units.

Figure 4:
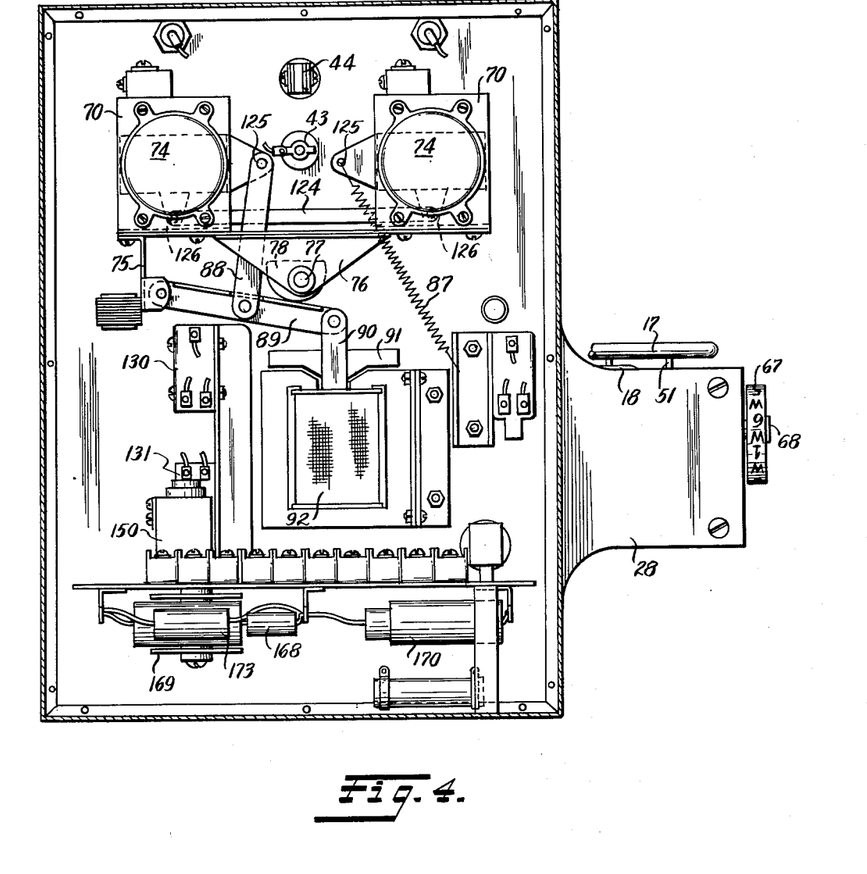
FIG. 4 is a sectional view of the rear of the apparatus taken on the line 4—4 of FIG. 3.

In addition to the dials and moving arms on the face of the front panel, each delay timer unit has three essential parts behind the panel. Using letters in FIGURE 3 to designate the complete mechanism of each timer part, CM refers to the electric clock motor. These units are commercially available. The EC section contains the complete electric clutch mechanism and the SC section contains the complete time shift compensator mechanism. These timer units are mounted behind the panel 28 upon the frames 70 which are secured to the panel by bolts 71. The clock motor 74 is spaced away from the frame 70 in each timer unit by posts 73 to which it is bolted (see FIGS. 3, 5 and 8). Screws 72 secure the electric clutch to the frame 70. A support 76 (see FIG. 3) which is bolted to both timer units bridging the space between them forms a support for shaft 77 which is turned by dial 23 on the front of panel 28. On this shaft 77 is secured a special heart-shaped cam 78 (indicated by dotted lines in FIG. 3) which is positioned immediately above the time oscillating linkage 89, 90 mounted on the bracket 75 (as shown in FIG. 4) and controls the distance that the plunger 91 of solenoid 92 moves in the upward direction. Thus cam 78 forms an adjustable stop in the linkage connections between the solenoid 92 and the two time shift compensator units SC for adjusting both simultaneously upon each return movement of the plunger when it is pulled downward by the solenoid.

Timing devices

The electric clutch section EC of each timer comprises an arrangement to magnetically couple and uncouple power to the movable time measuring hand 35 on the face of the timer. This is accomplished by means of shaft 93 (FIG. 8) to the outer end of which hand 35 is connected, and to the inner end of which a slotted lever 94 is connected and into the slot in which a pin 96 extends and forms a coupling with an arm 95 which is rigidly secured to a rotatable core part 97 of the solenoid 99. The two pieces 97 and 98 of the solenoid core are made of soft iron and are turned to have a tapering fit with each other when drawn to the center of solenoid coil 99 by an exciting current therein. A hole is drilled through part 98 and a brass (or non-magnetic) thrust pin 100 is inserted to separate the two parts 97 and 98 when the exciting current leaves the solenoid. A spring 101 and a tension adjusting screw 102 are used to control the amount of thrust between the two armature members. A small set screw is preferably used to prevent any change of the tension setting. The soft iron frame 106 that mounts coil 99 forms a continuous magnetic flux path except for the internal gap between the core pieces 97 and 98. This arrangement makes a point of intense magnetic attraction between core parts 97 and 98 when current is flowing in coil 99. The inside of the solenoid 99 is lined with a thin brass tube 105 which prevents the core parts 97 and 98 from freezing to the frame 106 when current is flowing in the coil.

A spiral spring 107 (see FIG. 11) is fastened to a frame projection 108 at one end and to core part 97 at the other end under tension such that, whenever core parts 97 and 98 are not locked together magnetically, the spring 107 will rotate shaft 93 anti-clockwise through the coupling members 94, 95 and 96 until the time measuring hand 35 on the face of the timer bumps against the stop 36. The end of clutch part 98 is machined to fit loosely over the small elapsed time indicating gear of the electric clock 74 such that when the clock is running it will rotate core part 98, and when current is flowing in solenoid 99 core part 97 will rotate hand 35, until it touches the pointer 47 on switch 48 (FIGS. 2 and 3). This stops the clock but leaves the solenoid energized. The hand 35 will hold this position until power is released from solenoid 99, at which time it will drop back against stop 36 through the action of spring 107.

The shift compensation section, or SC unit, is for automatically changing the timing interval with each sample selected throughout the complete sampling operation, and it provides a means of adjusting this automatic change or shift of the timing interval with each successive bulb filled by an amount varying from zero to the maximum amount which will be needed. FIGURES 2, 3, 8, 9, 10, 12 and 13 show views and sections of this mechanism. The mode of operation of the shifting delay timer consists of rotating timer arm 34 counterclockwise a small amount which may be termed the compensation increment, to increase the angular distance stop 36 is set from pin 37. The delay time is the interval that it takes clock driven hand 35 to move from stop 36 to pin 47, which increases with each bulb filled.

Dial 33 is fastened rigidly to hollow shaft 111 which goes through panel 28 and frame 70 and is free to rotate with respect thereto. A collar 112 secures the dial snugly against the panel, yet dial 33 may be rotated to set the time when screw 39 is loosened to release the pressure of clamp 38. Clamp 38 has a pin 49 which engages an opening in panel 28 and keeps the clamp from rotating when loose. Arm 34 has a pin 36 projecting from its face which is used to manually set dial arm 34 to its zero setting at the beginning of each automatic operation. A pin 37 on dial 33 determines the stopping position for dial arm 34 and band 35 when it is manually moved to the initial starting position. The tubular shaft 110 is free to rotate inside of shaft 111 as shaft 93 is free to rotate inside of shaft 110. On shaft 110 is a spring disc washer 116 and thrust collar 117 which is secured rigidly to shaft 110 by set screw 118. This collar 117 has a hub portion on which is mounted the smooth friction wheel 119, which is gripped on one side face against a side face of collar 117 by friction created by spring disc 120 and collar 121 mounted coaxially therewith and secured to said hub portion by suitable means such as the set screw 122. Collar 121 is adjusted to give three times as much friction to turning between friction wheel 119 and collar 117 as there is between collar 117 and collar 112 through spring disc 116 shown in detail in FIGS. 12 and 13. With this adjustment, if a counter-clockwise turning torque is applied to friction wheel 119 it will cause shaft 110 to turn counterclockwise and move delay arm 34 back to increase the time interval. Consequently a movement will also take place between collar 112 which is stationary and collar 117 which will move the shaft 110, because the friction due to spring disc 116 will yield before the friction due to spring disc 120. The friction in disc 116, however, is adjusted tightly enough to prevent movement caused by the impact hand 35 on the return stroke. The friction spring disc 120 is adjusted stiffly enough so that this friction coupling will always cause friction disc 116 to yield first. Because of the dogs 123 (shown in FIG. 10) wheel 119 will only turn in the counterclockwise direction. If stop 36 is rotated in a clockwise direction collar 117 will rotate clockwise while collar 112 and wheel 119 do not move. The spring disc washers 116 and 120 permit this movement, which permits arm 34 to be moved back against pin 37 when set for the first sample of each automatic operation of collecting a full set of samples.

Extending around the above described parts on shaft 110 is a movable U-shape frame 113 pivotally mounted at one end on a shoulder on collar 112 which engages in a hole of the frame and permits the whole frame to rotate. A washer 114 spaces this frame away from the panel, and an end member 115 is bolted to frame 113 on the far side near the solenoid. An axial hole in frame member 115 provides a second pivot bearing on shaft 110, and an extension of the frame member 115 having a hole 125 near its end, provides means on one of the timer units for connecting a link 88 for oscillating the frame 113 back and forth in unison with the up and down movements of the plunger 91 and linkage 89, 90.

As shown in FIG. 4, each frame 113 has a projection extending from its lower side with a hole 126 near its end for connecting the two timer units to operate in unison by means of a cross link 124. The hole 125 in the other timer oscillating frame 113 is used for attaching a spring 87 connecting the frame with a fixed point on the panel. This spring 87 returns both units to the zero position when lack of current in solenoid 92 releases plunger 91. This zero position is set by dial 23 as hereinafter described. The time delay action is mounted on frame 113 and comprises two friction members or dogs 123, each pivotally held at one side by one of two diametrically opposed supports 127 which maintain the dogs 123 against wheel 119, as shown in FIGS. 8, 9 and 10, two springs 128 furnishing the friction pressure for the dogs 123. Looking at FIG. 10, if the frame 113 is rotated in a clockwise direction, the dogs 123 will create friction enough to force wheel 119 to turn; but if the frame 113 is rotated in a counterclockwise direction, springs 128 will permit the dogs to slide along the surface of wheel 119 without moving it. Thus, when the frame 113 is rotated in the clockwise direction the angle of the dogs 123 to the surface of the wheel 119 causes the pressure to increase and move the wheel clockwise, thereby moving the arm 34 in the same direction to the same extent which is the counter clockwise direction as shown in FIG. 2, because the arm 24 is on the front end of the shaft 93. As the dogs 123 work on a smooth cylindrical surface, the compensating movement of the arm 34 depends upon the amount that frame 113 is caused to move, and that movement is controlled by the length of the stroke that the solenoid 92 is adjusted to have Thus where the manual movement of dial 33 is forcing it in a clockwise direction, as when resetting it for a new cycle, slippage takes place across both spring 116 and 120, because dogs 123 do not permit wheel 119 to turn in this direction When dial 33 is moved in a counterclockwise direction, slippage takes place only across spring 116 and wheel 119 moves with dial 33 in the counterclockwise direction because there is only a little resistance to the movement in this direction.

*Electrical circuits*

FIGURE 14 shows the electrical circuits controlling operation of the complete apparatus. At the bottom of the diagram the power connections are indicated at 110 volt, alternating current, this being suitable for the electric clocks commonly used. Lead 175 is a ground connection to the power lines and is a common lead to all coils, motors, pilot lights relays and solenoids. Lead 176 passes through the manual power switch 31, the fuse 43, and the valve motor operated switch 129. Switch 129 is used to automatically stop the unit after the last sample has been taken. Switch 129 is in contact with point 132 when the unit is in operation as shown, and when it is in contact with point 133 the operation is stopped. Contact point 133 then supplies current to the push button switch 32 and when the push button switch 32 is pressed in and makes contact with the point 163 the current flows to the valve motor 9 and advances the valve, restoring the contact with the contact point 132. As switch 129 snaps over from contact 133 to 132, it stops the motor by removing power from push button 32, which thus prevents overshooting the starting position even when button 32 is still being held in contact with 163.

This movement of the valve motor 9 and switch 129 sets the valve in the starting position and restores current to the operating unit as shown in FIG. 14. Switch 129 is actuated by one of the valve cams 60 in common with one of the squeeze valves. The notch of this cam is in the right place for stopping the unit after the last sample has been collected.

From the starting position of the apparatus it can be set manually for catching the next sample in any one of the bulbs 15 desired. Power goes from contact 132 to the movable contact 152 of the manual shifting switch 44. Normally contact 152 is in contact with fixed contact point 153 which passes the current to movable contact 155 which is also under the control of switch 44 but normally contacts fixed contact point 154. Normally contact 154 feeds current to the switch 5 in the recorder 3, but if the manual switch is tipped to the left it will move contact 155 and break contact with point 154 to cut power from the recorder and make contact with fixed contact point 156 which sends current to fixed contact point 135 on cam operated switch 130. This will send current to operate the valve motor 9, until the cam 11 breaks contact between the switch 130 and contact 135, when the motor stops leaving switch 130 in contact with fixed contact point 134. Contact point 156 will also send current to the solenoid 92 to cause a compensation time shift in the two timers 7 and 8 when this current is next cut off and upon releasing the pressure holding the manual switch 44 it will automatically return to the center position where contact between points 155 and 156 is broken, and contact is restored between points 155 and 154 as shown in FIG. 14. Now if the manual switch 44 is tipped to the right it breaks contact between points 153 and 152, taking power away from the rest of the system, and makes contact between the points 152 and 151 to send power to point 134 to switch 130. This will cause the motor valve to run until the cam 11 moves the switch 130 to break the contact with 134 and make it with 135. When pressure to the right is released it restores the center position of the manual switch 44 so that contact with 151 is broken and current can again flow from part 152 to the recorder switch 5. Repeated movements of the manual switch to the right, followed each time by a movement to the left, will move the valve to any position desired, and set the apparatus in readiness for automatic operation. When the full number of samples is not desired, for instance if it is desired to catch only two samples and have the unit automatically stop, the unit would be set manually to start with sample 5. After sample 6 the unit automatically shuts off. The automatic stopping with each left and right movement of the manual switch 44 prevents overshooting in setting the valve to any position.

Figure 1:
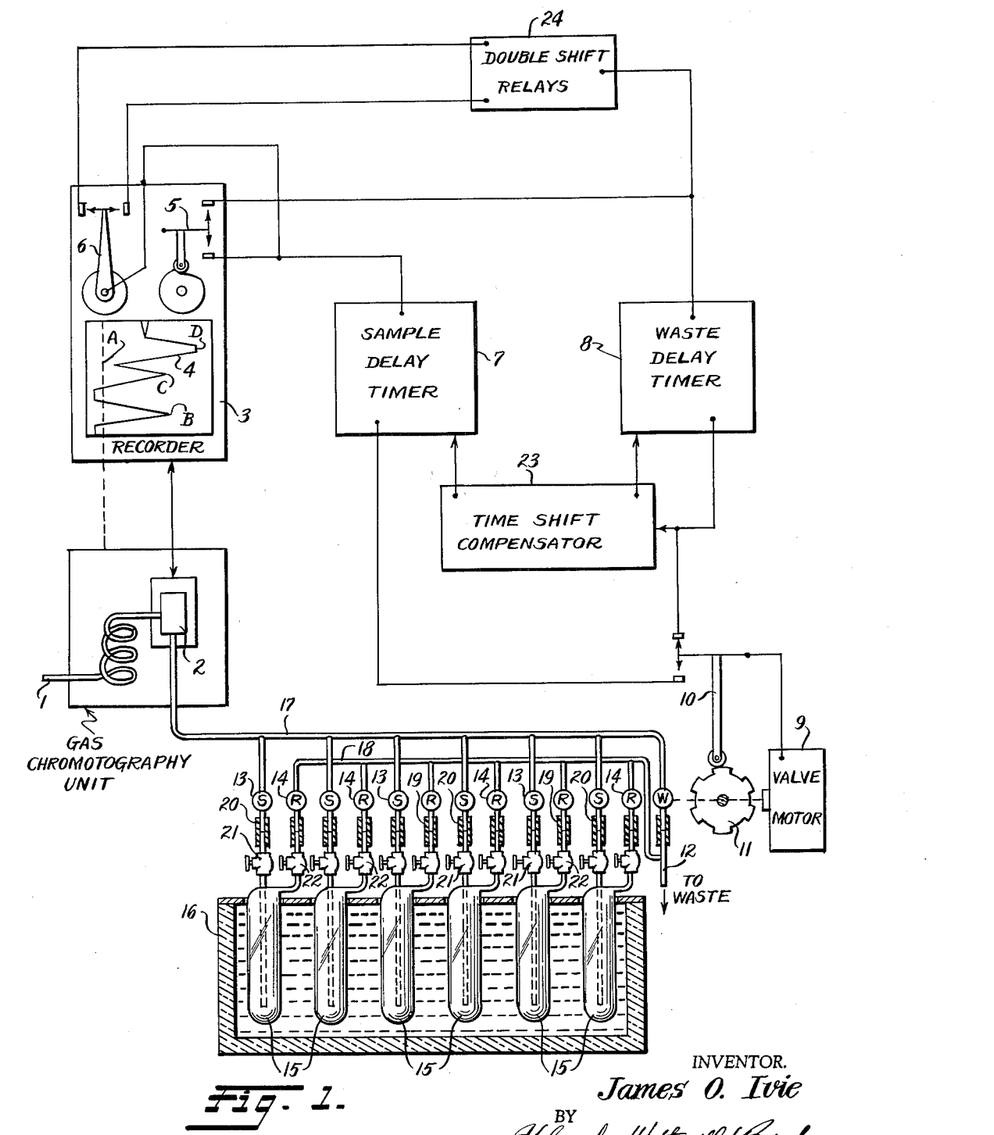
FIG. 1 is a schematic diagram showing the assembly of an automatic sample taking machine for gas chromatography.

The recorder 3 has a notched cam 177 mounted on the shaft which drives the recording pen, the notch on this cam being set so that when the pen is at zero, and up to the point indicated by the line A in FIG. 1, the switch cam follower will be in the notch and the armature 5 will be in contact with point 144 of the operating circuit. At all positions of the pen above this the switch cam follower will be out of the notch and make contact between armature 5 and contact point 145. When contact is made between armature 5 and contact point 144 current flows to the pilot light 46 to indicate the off position of the switch 5 and to the center contact of the waste timer switch 48. When the current first arrives at the center contact of this switch 48, the clock-driven time measuring arm 35 is against the stop 36 and the waste timer switch 48 makes contact with the point 143, sending current to the clock motor 74. When current comes to waste timer switch 48 it also flows through the resistor 168 and rectifier 169 to the solenoid winding 99 of the electric clutch unit of the waste timer. The rectifier 169 and a condenser 170 produce D.C. current for the operation of the waste timer electric clutch. The resistor 168 protects the rectifier 169 from excessive surges of current. With current flowing to both the electric clutch and the clock motor of the waste timer, the timer hand 35 moves clockwise away from the point 36 until it touches the arm 47 and throws the switch 48 from point 143 over to point 142. This stops the flow of current to the clock motor CM but leaves D.C. power in the electric clutch unit EC. In this condition it will hold the contact between switch 48 and point 142 until current is removed from the electric clutch by the pen operated switch 5 in the recorder. As soon as contact is made between switch 48 and contact point 142 it will send current to point 135 and cause the valve motor 9 to operate if there is contact between points 130 and 135. If 130 is in contact already with 134 because of the position of cam 11 the valve motor will not move. Contact 142 also sends power to solenoid 92 to cause a compensatory time shift, as heretofore described. In normal operation of the apparatus this will be the position of the unit in starting a sampling cycle, with the waste pilot light on and current flowing in solenoid 92. The starting position on dial marker of the dials 67 as illustrated in FIG. 2 is in waste position, which permits gas to flow out through valve W to the waste line. At this time pin 36 on both timers is forced manually clockwise until it is stopped by pin 37 on dials 33. With this setting the unit is ready for automatic operation.

*Automatic operation*

When a gas sample in measuring cell 2 causes the recorder pen to move above or to the right of the line A, depending upon the manner in which the device is set up, the recorder switch 5 moves from contact 144 to contact 145. This causes the pilot light 46 to go out, and also cuts off current from the EC unit of the waste timer; thus the time measuring arm 35 will fall back against the stop 36, breaking the circuit at contact 142, and the current being removed from the solenoid 92 will allow the plunger 91 to rise, because of a spring, until the linkage 90 bumps the cam stop 78 which sets the proper distance allowed for compensation shifts. With the contact established between switch 5 and contact 145 the current will flow to pilot light 45 to indicate current in the sample taking circuit and to switch 48 of the sampling delay timer which is in contact with the point 157. At this instant alternating current flows to the clock motor 74 and direct current to the electric clutch EC through resistor 164 and rectifier 165, with condenser 167 doing the filtering, all as shown in FIG. 14. This starts time measuring hand 35 moving clockwise and when the number of seconds determined by the setting has elapsed, hand 35 moves arm 47 to break contact at 157 to stop the clock motor and make contact at 158 to send current to point 134 of switch 10, thence through armature 130 to motor 9 to advance the valve to the first sample catching position. As soon as this shift is made, cam 11 operates switch 10 causing armature 130 to break contact with point 134 and make it with point 135, so that the motor operating circuit is ready for the next surge of current on the waste delay timer side.

As long as the gas sample in the chromatography unit keeps switch 5 in contact with point 145 pilot light 45 will stay on, and sampling timer arm 35 will keep the contact between switch 48 and point 158. When the gas sample again causes the pen to move past line A to zero position on the recorder, the switch 5 changes from point 145 to point 144. This cuts off current from the sample timer so that it will reset itself, and causes the waste timer to operate again until (after the proper delay) it shifts the valve on to a waste position. At the same time it causes an increase of delay time in both timers through the flow of current to solenoid 92. The alternate switching of the recorder and switch 5 between point 144 and 145 will move the valve to each sample catching position and each waste position in succession until the last sample tube has been filled, then switch 129 will shut the unit down.

At times two gas samples will pass through the cell 2 so close together that the recorder 3 will not pass the line A to zero but changes direction and moves back up before contact 5 has been broken with contact 145. See points C and D of the recorder in FIGURE 1, on curve 4. In this situation there is no waste period and no need for the valve to stop in a waste position. Switch 6 is also mounted in the recorder to cause this double switch of the valve. Switch 6 has the armature 6 which is free to rotate on the recorder shaft with a limited amount of friction applied to it by pressing it between collars 159 and 161. The pressure on spring 162 determines the amount of friction. The washer 160 prevents wear on the spring. The shaft, together with washers 159 and 161, will rotate with the recorder shaft in either direction and they will tend to drag arm 6 along with them by the friction created by spring 162. As the amount of this friction is small the shaft will continue to turn even though arm 6 is prevented from turning by restricting its end between the two contacts 146 and 147. With this arrangement, when the recorder is moving up it holds contact with point 146 and when it moves down it holds contact with point 147. As long as the recorder switch 5 keeps reversing on each gas sample this part of the circuit has no effect on the operation of the valve. However, when the recorder is moving down and there is a change in direction before switch 5 breaks contact with 145, then the action of switch 6 becomes effective.

When the recorder is drawing the curve 4 from C on towards zero, switch 6 will be held in the down position and will be in contact with point 147. Arm 6 gets its power from point 158 on the sample timer which is supplied through point 145 from switch 5 in the recorder. As the recorder is moving down current will flow through resistor 171 and rectifier 172 to give D.C. current to the coil of relay 150. Condenser 173 is used in this case, not only to filter the rectifier D.C., but a condenser value is chosen to give a time delay to the opening of the relay when the current is removed. When the recording direction reverses switch 6 will break contact with point 147 and make contact with point 146. This will send current to the armature 179 of relay 150. As this relay will still be closed because of the delayed time of opening, current will pass to point 178 on to relay 141 where it will cause it to close contacts 140 and 137 and 139 and 138. At the same time, current from point 146 flows to switch 131 where it makes contact with point 136 and feeds power to points 137 and 138. When the unit is in the sampling position, switch 130 will be in contact with point 135 connected to the waste-timer, and switch 131 will be in contact with 136 at the same time. The contact between 137 and 140 keeps relay 141 from opening up when relay 150 finally opens up and breaks the contact between 179 and 178. The contact between 138 and 139 supplies power to the waste timer to give the delayed time operation of the valve. As soon as the waste timer makes contact between 48 and 142 the motor will move the valve to break the contact between 130 and 135. This would be in the normal waste period; however, as power is already in contact point 134, the motor does not stop but continues to move until cam 11 returns contact 130 back to point 135. When switch 130 breaks contact with point 135 and moves to point 134, switch 131 breaks contact with point 136. The opening of contacts 131 and 136 removes the power from the waste timer and the relay coil 141 of switch 131. This allows the waste timer to reset itself to zero where it is ready for the next operation.

Relay 141 now opens the circuit so that when contact 130 again reaches point 135 the valve motor will stop in the next sampling position. The brief flow of current through the waste timer to motor 9 is also sufficient to operate the time shift compensator properly. With this combination the system will automatically use any combination of single or double shifts until all the sample bottles have been filled and then shut the unit down until the samples are removed and new ones added. The manual switch 44 makes it possible to set the unit to any number of samples to be collected before it shuts itself off, the maximum number being the total number of sample tubes 15 used on the unit.

In accordance with the provisions of the statutes, the best form of embodiment of this invention has been described and illustrated, but it will be apparent to those skilled in the art that changes may be made in the arrangement of the apparatus disclosed, without departing from the spirit of this invention as set forth in the appended claims, and that in some cases certain features of this invention may be used to advantage without corresponding use of other features.

For example, it is not necessary to use a solenoid to operate the timer compensation mechanism, because it is impossible to mechanically couple the shifting of the time to the motor that runs the valve. Also a valve motor that operates from behind the panel may be substituted advantageously, having a driving wheel that makes one revolution for each shift of the valve position, a cam on the shaft of this wheel transmitting movement to the compensation mechanism proportionally to the movement permitted by the dial position.

What is claimed is:

An automatic timer which comprises:
(a) a constant speed motor;
(b) a solenoid clutch mechanism, comprising a soft iron shaft connected to said constant speed motor and rotating within a brass shell and having a spring loaded non-magnetic plunger therein, a second soft iron shaft within the said brass shell having a conical end thereon normally restrained from contacting said first shaft by means of said spring loaded brass plunger, said second shaft driving a delay timing mechanism, said brass shell being surrounded by the windings of a solenoid;
(c) said delay timing mechanism comprising a shaft operating an electrical contact pointer, an adjustable pointer mounted on the shaft surrounding said operating shaft and having connected therewith a smooth friction wheel which drives a spring disk and collar, said friction wheel being restrained from rotation in one direction by means of spring loaded dogs.

References Cited by the Examiner

UNITED STATES PATENTS

| | | | |
|---|---|---|---|
| 2,028,933 | 1/1937 | Johnson | 74—3.54 |
| 2,172,623 | 9/1939 | Pitney | 74—3.52 |
| 2,197,955 | 4/1940 | Crowley | 251—7 |
| 2,315,266 | 3/1943 | Lurtz | 74—3.54 |
| 2,361,262 | 10/1944 | Candor | 74—3.52 |
| 2,596,330 | 5/1952 | Everard | 74—526 |
| 2,674,435 | 4/1954 | Angell | 251—7 |
| 2,698,888 | 1/1955 | Coe | 74—3.5 X |

BROUGHTON G. DURHAM, *Primary Examiner.*

ISADOR WEIL, *Examiner.*

A. COHAN, T. W. SHEAR, *Assistant Examiners.*